United States Patent [19]
Alm et al.

[11] Patent Number: 4,923,903
[45] Date of Patent: May 8, 1990

[54] DYED AQUEOUS AIR FOAMS

[75] Inventors: Roger R. Alm; Richard M. Stern, both of St. Paul, Minn.

[73] Assignee: Minnesota Mining and Manufacturing Company, St. Paul, Minn.

[21] Appl. No.: 301,512

[22] Filed: Jan. 24, 1989

[51] Int. Cl.$^5$ .............................................. C08G 18/14
[52] U.S. Cl. .................................... 521/65; 427/385.5; 521/137; 521/159; 521/164; 521/166; 521/167
[58] Field of Search ................. 521/65, 159, 164, 166, 521/167, 137; 427/385.5

[56] References Cited

U.S. PATENT DOCUMENTS

| | | | |
|---|---|---|---|
| 3,330,782 | 7/1967 | Poppelsdorf | 260/2.5 |
| 3,904,557 | 9/1975 | Guthrie et al. | 260/2.5 BD |
| 4,038,240 | 7/1977 | Hugl et al. | 260/37 N |
| 4,315,703 | 2/1982 | Gasper | 405/264 |
| 4,775,748 | 10/1988 | Kluger et al. | 534/729 |
| 4,795,590 | 1/1989 | Kent et al. | 252/307 |
| 4,795,764 | 1/1989 | Alm et al. | 521/107 |

FOREIGN PATENT DOCUMENTS 51-129495  2/1976  Japan .

OTHER PUBLICATIONS

Journal of American Society, 49, p. 3181 (1927).
Bannisert, D. W., Olin, A. D., & Stingl, H. A., "Dyes and Dye Intermediates", Kirk–Othmer Encyclopedia of Chemical Technology, 3rd Ed., 8, John Wiley and Sons, (1979), pp. 162–168.
"Foams", J. J. Bikerman, Springer–Verlag, New York, Inc., pp. 108–132 (1973).
Moore, P. D. Miley, J. W., & Bates, S., "New Uses for Highly Miscible Liquid Polymeric Colorants in the Manufacture of Colored Urethane Systems", J. of Cellular Plastics, Jul./Aug. 1983, pp. 221–226.
Miley, J. W., & Moore, P. D., "Reactive Colorants Go Well with PUR", Modern Plastics, Nov. 1982, pp. 74–76.
Libert, C., & Merechal, E., "Synthesis of Macromolecular Substances from Monomers Containing Chromophoric Groupe -XIX- Synthesis of Oligothers and Oligoesters with Chromophoric End Groups", Europ. Polymer J., 16, 1980, pp. 1121–1125.

Primary Examiner—Maurice J. Welsh
Attorney, Agent, or Firm—Donald M. Sell; Walter N. Kim; Eloise J. Maki

[57] ABSTRACT

Air is mechanically entrained in a dyed or colored, aqueous solution comprising surfactant, poly(oxyalkylene) polyisocyanate prepolymer and the reaction product of said prepolymer and one or more isocyanate-reactive dyes, the poly(oxyalkylene) portion of said prepolymer containing sufficient oxyethylene units to render the prepolymer and the reaction product water-soluble and hydrophilic, to form a dyed or colored, fluid, aqueous air foam which is sprayed or otherwise applied to exposed surface of a substrate, e.g. a sanitary landfill, the applied foam gelling or increasing in viscosity, due to the polymerization, e.g., by reaction with water or polyamine, of the prepolymer and the reaction product, to form a dyed or colored, poly(oxyalkylene) polyurea polymer, forming a persistent, dyed or colored, gelled or viscous air foam in the form of a coating on the exposed surface, thus sealing or otherwise protecting or controlling the substrate and coloring the substrate making it more visible, decorative, or less visible, thereby camouflaging the substrate.

40 Claims, No Drawings

DYED AQUEOUS AIR FOAMS

This invention relates to water-containing air foams of polyurea polymer derived from hydrophilic, poly(oxyalkylene) poly(isocyanate) prepolymer, said foams being used to consolidate or seal substrates. In another aspect it relates to methods used to prepare said foams. In still another aspect, it relates to the treatment of hazardous materials and other substrates such as those in hazardous waste sites and spilled or escaping from storage or transportation facilities. In yet another aspect, it relates to dyes for polyurethane compounds.

Dyes for polyurethanes have been described in the art. Dyes which can react with isocyanate groups in polyurethane prepolymer such that the dye molecules become incorporated in the polyurethane molecules are described in for example, U.S. Pat. No. 4,775,748 (Kluger et al.), Moore, P. D., Miley, J. W., and Bates, S., "New Uses for Highly Miscible Liquid Polymeric Colorants in the Manufacture of Colored Urethane Systems," *J. of Cellular Plastics*, Jul./Aug. 1983, pp 221–226, Miles, J., and Moore, P., "Reactive Colorants Go Well With PUR," *Modern Plastics*, Nov. 1982, pp 74–76, U.S. Pat. No. 4,038,240 (Wolfrum), Japanese Kokai 51/129495 (Shigeo et al), U.S. Pat. No. 3,904,557 (Guthrie), Libert, C., and Merechal, E., "Synthesis of Macromolecular Substances from Monomers Containing Chromophoric Groups -XIX- Synthesis of Oligoethers and Oligoesters with Chromophoric End Groups," *European Polymer Journal*, 16, 1980, pp. 1121–1125.

Water-containing air foams useful in consolidating or sealing substrates, e.g., hazardous waste sites or sanitary landfills, have also been described in the art. For example, U.S. Pat. No. 4,795,590 (Kent et al.) describes air foams created by aerating an aqueous solution of surfactant and poly(oxyalkylene) isocyanate polymer, the poly(oxyalkylene) isocyanate polymer being prepared from polyether polyols and aliphatic or, preferably, aromatic polyisocyanates. Said foam is a fluid, water-based air foam that can gel or increase in viscosity, due to the reaction of the isocyanate polymer with water, to form a poly(oxyalkylene) polyurea polymer, resulting in a persistent gelled air foam or viscous air foam.

U.S. Pat. No. 4,795,764 (Alm et al.) describes similar air foams created by aerating an aqueous solution of surfactant and poly(oxyalkylene) polyurea polymer derived from poly(oxyalkylene) poly(aliphatic isocyanate) prepolymer and polyamine. The isocyanate moieties of the prepolymer react with water-soluble polyamine in the presence of water, as a solvent, to form said polyurea polymer. The polyurea polymer product can be aerated to form a water-based, aerated or air-entrained, closed cell, air foam. The foam, as prepared, is fluid and can be subsequently converted or stabilized in the form of either a non-fluid, gelled air foam or a viscous air foam, and said foams can contain dyes or pigments.

One aspect of this invention is dyed or colored, non-extractable or non-leachable, air-entrained, closed cell, low density, fluid, aqueous air foam useful, for example, to camouflage, or color substrates, e.g., sanitary landfills.

For the purposes of this invention, "dyed or colored" means having visually perceptible color either to the naked or unaided eye, or to the aided eye, e.g., that light visually perceived by the eye after shining a light on a fluorescing dye placed in the dark, or spectro-photometric absorption. For the purposes of this invention, "non-extractable or non-leachable" means that the color of said air foam cannot be readily extracted or leached from the foam by contacting the foam with water at ambient temperature in accordance with the Comparative Extraction Test described herein. Whereby, in accordance therewith, "readily" means that the ratio of the light absorbances of a foam leachate solution and a control solution is less than or equal to 0.3. The term "air foam" is used in its industry-accepted sense to mean a foam made by physically mixing air into a liquid, and thus the term is distinct from chemical or carbon dioxide foam or halocarbon blown foam.

The dyed or colored, fluid, aqueous air foam as prepared and applied to a substrate is initially a fluid, two phase-system (an agglomeration of air bubbles) of a discontinuous or dispersed gas phase, viz., air, and a continuous, dyed or colored, polymeric, aqueous, liquid phase, viz., bubble walls or lamellae. Said dyed or colored, polymeric, aqueous liquid phase polymerizes after application to form a three dimensional, closed cell structure of dyed or colored, stabilized foam, i.e. gelled or viscous foams, on the substrate surface.

The dyed or colored polymeric, i.e., aqueous liquid phase of the dyed or colored, aqueous, air foam is its major or predominant phase by weight. Said phase comprises water as its major component, in which is dissolved or dispersed small amounts of organic material, namely surfactant and dyed or colored, gelling or viscosity-increasing agent. Optionally the liquid phase can further comprise water-soluble polyamine and other components or adjuvants such as those described in U.S. Pat. No. 4,795,764 such descriptions herein incorporated by reference.

The dyed or colored, gelling or viscosity-increasing agent is hydrophilic, poly(oxyalkylene) polyisocyanate prepolymer containing sufficient oxyalkylene groups to render it hydrophilic. Said agent is a mixture or blend consisting or consisting essentially of a first amount of hydrophilic, poly(oxyalkylene) polyisocyanate prepolymer and a second amount of the reaction product derived from prepolymer and one or more isocyanate-reactive dyes, e.g., Bismarck Brown TSS.

The isocyanate-reactive moieties in the dye are those which will react with isocyanate moieties in the prepolymer until residues of substantially all of the isocyanate-reactive dye are covalently bonded to said prepolymer. Thus said dye cannot readily be extracted or leached from the dyed or colored, aqueous air foam by contacting or mixing said foam with water.

Said isocyanate-reactive dyes are inherently colored, light absorbing, or fluorescing, water-soluble or water-dispersible compounds or compositions comprising molecular species having at least one chromophoric moiety, and at least one, and preferably more than one, isocyanate-reactive moieties. For the purpose of this invention, an "isocyanate-reactive moiety" is a moiety which is capable of reacting with an isocyanate moiety under urethane or urea bond-forming conditions (determined by the Zerewitinoff procedure, *Journal of American Chemical Society*, 49, p. 3181 (1927) such as that disclosed in U.S. Pat. No. 3,330,7820). Preferably, said isocyanate-reactive moieties are selected from the group consisting of (1) —NHR, where R is hydrogen, alkyl, aryl or aralkyl, (2) —SH, and (3) aliphatic hydroxyl moieties. For the purposes of this invention, "aliphatic hydroxyl moieties" are hydroxyl moieties covalently bonded to an aliphatic carbon atom (i.e., —C(R$^1$)(R$^2$)—OH, where R$^1$ and R$^2$ are independently selected from the group consisting of hydrogen, alkyl, aryl, and aralkyl groups).

Upon or following application of the dyed or colored, fluid aqueous air foam to the surface of a substrate, and as a consequence of the polymerization of the dyed or colored, gelling or viscosity-increasing agent to form dyed or colored, polyurea polymer, i.e., polyurea polymer having one or more covalently bonded residues derived from said isocyanate-reactive dye, the three-dimensional, closed cell structure of applied foam is thus stabilized in the form of either a dyed or colored, non-extractable or leachable non-fluid, gelled air foam or a dyed or colored, non-extractable or leachable, viscous air foam. The dyed or colored, gelled air foam is a two-phase system of discontinuous gas (air) phase and a continuous, soft, semi-solid hydrogel phase. Said hydrogel phase comprises bound water and water-insoluble, dyed or colored polyurea polymer. The dyed or colored, viscous air foam is a two-phase system of discontinuous gas (air) phase and a continuous dyed or colored, polymeric, aqueous phase comprising water and dyed or colored polyurea polymer.

The dyed or colored polyurea polymer in both the dyed or colored, gelled and dyed or colored, viscous foams comprises, like the precursor prepolymer, a plurality of poly(oxyalkylene) chains, the oxyethylene content being sufficient to render the polymer hydrophilic. The gelled or viscous phase of the foam is the major or predominant phase by weight of the dyed or colored, aqueous air foam. The lamellae or liquid film of the air bubbles in the applied, dyed or colored fluid foam is gelled, or becomes viscous, thus minimizing, reducing, or preventing the drainage of liquid from the lamellae and the consequent rupture of the bubbles and collapse of the foam structure. Due to the hydrophilic nature of the dyed or colored, polyurea polymer, water in the foam is retained or bound, and it, together with the closed cell nature of the resulting dyed or colored, gelled or viscous foam, provides a stable, persistent or long-lasting, sealing or vapor suppressing blanket or barrier on the exposed, treated surface of the hazardous material or substrate to which the foam is applied.

The dyed or colored aqueous air foam of this invention can be sprayed or otherwise applied as a wet, three-dimensional coating, blanket, or layer to exposed surface of a substrate, such as a sanitary landfill or a body of hazardous material such as a hazardous waste dump or a pool of a spilled, volatile, flammable liquid. The applied foam can then gel, or increase in viscosity without gelling, thus stabilizing in situ to form either a dyed or colored, wet, persistent or long-lasting, sealing or vapor suppressing, closed cell, hydrogel air foam, or a dyed or colored, viscous, water-containing air foam, in the form of a coating, blanket, or layer on the substrate. Such a dyed or colored coating can either camouflage the substrate by permitting it to blend in with its surroundings, or it can make the substrate more visible or even decorative, if desired, depending upon the particular dye used to react with the prepolymer. Said coating also results in minimizing, suppressing, controlling, reducing or preventing the emission, spreading, or release of gases, vapors, odors, dusts, liquids, or wind blown litter that may be present in the hazardous material or substrate and physically immobilizing, constraining, consolidating, sealing, or inactivating the exposed surface so coated.

The dyed or colored air foam can be conveniently formed by mechanically or physically entraining or dispersing air in a fresh or just-prepared, low viscosity, dyed or colored, aqueous polymer liquid phase described above using methods similar to those described in said U.S. Pat. Nos. 4,795,590 and 4,795,764, those descriptions herein incorporated by reference. For example, the dyed or colored, polymeric, aqueous liquid phase can be pumped to air-aspirating or air-injecting, foam-producing equipment and applied, for example, by spraying the resulting fluid, low density foam onto the substrate. When said gelling or viscosity-increasing agent comprises water-reactive poly(oxyalkylene) polyisocyanate prepolymer, e.g., poly(oxyalkylene) poly(aromatic isocyanate) prepolymer, (such as some of those described in U.S. Pat. No. 4,795,590) the dyed or colored, polymeric, aqueous liquid phase can be prepared at the time of application by bringing together two liquid streams from separate sources. One stream comprises water and surfactant and the other stream is in the form of a concentrate comprising the dyed or colored, gelling or viscosity-increasing agent dissolved in an anhydrous, aprotic, water-soluble or -dispersible, non-reactive organic solvent. Alternatively, one stream can comprise water and the other stream can be in the form of an anhydrous concentrate comprising surfactant and dyed or colored, gelling or viscosity increasing agent dissolved in said solvent. However, since water will react with prepolymer and with the gelling or viscosity increasing agent when they come together, they should be kept separate, until or just before, the fluid foam is prepared and applied. When the gelling or viscosity-increasing agent comprises a poly(oxyalkylene) poly(aliphatic isocyanate) prepolymer, (such as those described in U.S. Pat. No. 4,795,764) the dyed or colored, polymeric, aqueous liquid phase can also be prepared at the time of application by bringing together two liquid streams from separate sources. One stream comprises water, water-soluble polyamine reactant, and surfactant. The other stream in the form of a concentrate comprises the dyed or colored, gelling or viscosity-increasing agent dissolved in an anhydrous, aprotic, water-soluble or -dispersible, non-reactive organic solvent. Alternatively, one stream can comprise water and water-soluble polyamine reactant and the other stream can be in the form of an anhydrous concentrate comprising surfactant, and dyed or colored, gelling or viscosity-increasing agent dissolved in said solvent. Said water-soluble polyamine reactant polymerizes with said gelling or viscosity-increasing agent to form dyed or colored polyurea polymer, said polyurea polymer containing one or more polyureylene-containing segments formed from said polyamine and said agent.

The dyed or colored, gelling or viscosity-increasing agent can be prepared by combining, in reactive admixture, the desired amounts of prepolymer and isocyanate-reactive dye. Said prepolymer and said dye can be dissolved in an anhydrous, aprotic, water-soluble or -dispersible, non-reactive, organic solvent. Alternatively, depending upon the solubility of the dye in the prepolymer, the dye can be dissolved directly in the prepolymer. The admixture is then mixture held at the desired reaction temperature, e.g., approximately 50° C. to 85° C., for the desired reaction time, e.g., approximately 1 to 24 hours to complete reaction of the two. The amount of isocyanate-reactive dye used in preparing the reactive admixture should be sufficient to provide the desired color and color intensity in the resulting air foam.

The dyed or colored air foams of this invention can be used in many of the same applications as the air foams described in the art. As an operator mixes the dyed or colored foams of this invention as described above, he or she can be assured merely by visually inspecting the foam, whether the stream containing the dyed or colored, gelling or viscosity-increasing agent is being pumped into the air-aspirating or air-injecting, foam-producing equipment. In addition, the color and intensity of the foam will be an approximate indication to the operator of the amount of dyed or colored, gelling or viscosity-increasing agent being pumped to said foam-producing equipment. The dyed or colored foams of this invention cannot only camouflage a covered substrate, such as a sanitary landfill, increasing its acceptability to the public, but the dye cannot be readily extracted from the foam by contacting said foam with water, e.g., by exposure to rain. Therefore, the dye will not significantly contaminate or color sanitary landfill leachate. In addition to this feature, the foams of this invention provide good coverage, and are substantially opaque even after they have dried down to form films. These features contribute to this foam's usefulness as a sanitary landfill cover. The clay-brown colored foams of this invention will be particularly accepted by sanitary landfill operators because the color camouflages the landfill permitting it to blend in with surrounding soil, and because the dye will not color or contaminate the landfill's leachate.

The relative amounts of the various components of the dyed or colored foams of this invention can vary widely. Functionally expressed, the amount of surfactant to be used will be that sufficient to cause a dyed or colored, aqueous foamable solution (comprising surfactant, dyed or colored gelling or viscosity increasing agent, water and optionally, depending on the prepolymer comprising said agent, water-soluble polyamine) upon aeration, to form an appropriately colored foam having sufficient expansion value such that said foam has a density less than 1 g/cc. The expansion value of the foam generally will be greater than about 2, and preferably will be 5 to 50, and can be as high as 200. Such a foam will thus float on water and is less dense than most other liquids, e.g., flammable liquids, and thus is generally buoyant. Such a dyed or colored foam will also provide good coverage of a substrate and remain opaque and colored even when the foam dries down to form a film. Generally, the surfactant will be about 0.05 to 2 weight percent, preferably about 0.2 to 0.5 weight percent, of the foamable, dyed or colored, polymeric, aqueous solution. The amount of air to be entrained in said foamable solution will be that sufficient to obtain sufficient expansion; in any case, however, the amount of air to be entrained generally will be such that the dyed or colored, fluid air foam and the dyed or colored, gelled or viscous air foam will have the aforementioned expansion value, and preferably the entrained air will be the major component of the foam thereof by volume, i.e., greater than 50 volume percent, and even as high as 99 volume percent, and more preferably in the range of 80 to 98 volume percent. The amount of air entrained in the foamable solution will also affect the intensity of color of the resulting air foam. Since the greater the amount of entrained air in the foam, the less color intensity the foam will have, the amount of dye in the foamable solution and the expansion value of the resulting dyed or colored, aqueous air foam must be selected to ensure that the foam will have both the desired color intensity and the desired density and coverage. The amount of water to be used in forming the dyed or colored foam will be that sufficient to provide sufficiently low viscosity to the foamable solution to enable its efficient handling and to enable the dyed or colored, fluid foam to flow and cover the desired substrate area and form a foam of sufficient expansion and quality; in any case, however, the amount of water to be used will be such that it is the major component, by weight, i.e. greater than 50 weight percent and generally about 53 to 98 weight percent, preferably 75 to 97 weight percent, of the foamable solution. However, the amount of water will be far in excess of that required to react with all the isocyanate moieties of a dyed or colored, water-reactive, gelling or viscosity-increasing agent, if such agent is used to practice the invention. The amount of dyed or colored, gelling or viscosity-increasing agent in the solution will be that sufficient to gel or merely increase the viscosity of the fluid foam, whichever is desired, at a desired time upon or after application of the fluid foam to the substrate, which time can be from less than 10 seconds to 20 minutes or longer after the foamable solution is formed. The amount of gelling or viscosity-increasing agent will also be sufficient to provide the desired color in the resulting foam. The amount of dyed or colored, gelling or viscosity-increasing agent can depend, for example, on the functionality of the prepolymer, the amount, if any, of water-soluble polyamine reactant, and the presence of catalysts. Said amount can also depend on the desired extent or nature of the application, e.g. how large an area is to be covered with the dyed or colored, fluid foam before it gels or reaches its desired increase in viscosity, whether the substrate is horizontal, vertical, or inclined, the particular hazard to be controlled, etc. Generally, the amount of the dyed or colored, gelling or viscosity-increasing agent (excluding its solvent) will be a small amount, about 2 to 15 weight percent, preferably about 3 to 10 weight percent, of the foamable solution. Thus, the solids content of the foams of this invention which is attributable to the gelling or viscosity-increasing agent will be low. When the gelling or viscosity-increasing agent is used in the form of a concentrate solution in an organic solvent, e.g., acetone, such solutions will have a concentration generally about 50 to 90 weight percent of the agent, depending upon the molecular weight and chemical nature of the agent.

Generally, polyamine reactant is present in dyed or colored, foamable solution only when the gelling or viscosity-increasing agent comprises poly(oxyalkylene) poly(aliphatic isocyanate) prepolymer and reaction product of said prepolymer and one or more isocyanate-reactive dyes. Such prepolymers are described in U.S. Pat. No. 4,795,764. The amount of polyamine reactant will generally be a stoichiometric equivalent amount to react with the available isocyanate groups in the dyed or colored, gelling or viscosity-increasing agent. Greater or lesser amounts, e.g. NH/—NCO ratios of up to 2/1 or even 4/1, or lesser amounts, e.g. NH/—NCO ratios as low as $\frac{1}{2}$ or even $\frac{1}{4}$ can be useful to obtain desired gel times and quality. More or less polyamine will usually result in delay or prevention of gelation. If only viscosity increase is desired, functionality of gelling or viscosity-increasing agent and/or polyamine must be considered as well as stoichiometry.

As stated above, the dyed or colored, gelling or viscosity-increasing agents useful in this invention are mixtures or blends consisting or consisting essentially of a first amount of poly(oxyalkylene) polyisocyanate prepolymer and a second amount of reaction product derived from prepolymer and isocyanate-reactive dye (hereinafter occasionally referred to as "dye derivatives"). The major amount of said agent, i.e., 50 weight percent or more, and preferably 90 weight percent or more, is hydrophilic, poly(oxyalkylene) polyisocyanate prepolymer. A minor amount of said agent, i.e., no more than 50 weight percent, preferably no more than 10 weight percent, is dye derivative.

Since residues of said isocyanate-reactive dye are covalently bonded to said prepolymer, and ultimately to said dyed or colored, polyurea polymer, said dye cannot readily be extracted or leached from the dyed or colored air foam by contracting or mixing said foam with water. That is, the ratio of the light absorbances of water solutions prepared by contacting a dyed or colored, aqueous air foam and a control with water (according to the Comparative Extraction Test described herein at EXAMPLES 1–12) is no greater than 0.3, and preferably is less than 0.15.

The dyed or colored, gelling or viscosity-increasing agent can be prepared by combining the desired amounts of prepolymer and isocyanate-reactive dye in reactive admixture. Generally less than 10 weight percent, preferably less than 2 weight percent, and most preferably less than 1 weight percent of said admixture will be dye. Preferably, the smallest amount of dye providing the desired color and color intensity will be used in this invention since this level will generally result in the most economical dyed or colored, aqueous air foams. Generally, said admixtures further comprise 0 to 50 weight percent of water-soluble or -dispersible, anhydrous, aprotic, non-reactive organic solvent and 50 weight to 100 weight percent prepolymer. However, if the dye or dyes are soluble in the prepolymer, no organic solvent is required.

As stated above, said admixture must be held at a sufficiently high reaction temperature for a sufficient time to ensure that substantially all of the isocyanate-reactive dye reacts with isocyanate moieties in the prepolymer. The reaction time and temperature will depend upon the relative reactivity of the dye's isocyanate-reactive moieties with the prepolymer's isocyanate moieties. Such factors as the chemical structure of the isocyanate-reactive dye, the chemical structure of the prepolymer (e.g., poly(aromatic isocyanate) prepolymer will generally be more reactive with isocyanate-reactive dye moieties than poly(aliphatic isocyanate) prepolymer) and the solubility of the isocyanate-reactive dye in said organic solvent or prepolymer can affect the selection of the reaction time and temperature. Generally suitable reaction temperatures will be between 50° C. and 85° C. and preferably between 50° C. and 85° C. Temperatures higher than 120° C. will result in the undesirable side reactions (e.g., allophanate or isocyanurate formation), so excessive exposure to temperatures higher than 100° C. is undesirable. Generally suitable reaction time will be between 1 and 24 hours, and preferably between 8 and 24 hours.

The prepolymers useful in this invention and their methods of preparation are described in U.S. Pat. Nos. 4,795,590 and 4,795,764, which descriptions are herein incorporated by reference. Both the water-soluble, water-reactive, hydrophilic, aromatic isocyanate-terminated prepolymers described in U.S. Pat. No. 4,795,590 and the water-soluble, low moisture sensitive, amine-reactive, hydrophilic, aliphatic isocyanate-terminated prepolymers described in U.S. Pat. No. 4,795,764 can be used to prepare the dyed or colored, aqueous air foams of this invention.

Some of the prepolymers useful in this invention can be expressed in terms of the formula:

$$Y_1[(R^3O)_o\text{—}Y_2(NCO)_p]_z \qquad \text{A}$$

In Formula A, $Y_1$ is an active hydrogen-free residue of a low molecular weight, initiator organic compound having a plurality of active hydrogen atoms (e.g. 2 or 3), such as a polyhydroxyalkane, polyaminoalkane, or polyether polyol, e.g., ethylene glycol, ethylene diamine, glycerol, or 1,1,1-trimethylolpropane. $(R^3O)_o$ is a hydrophilic poly(oxyalkylene) chain having a plurality of oxyethylene units and, optionally, higher oxyalkylene units, e.g., units with 3 or 4 carbon atoms, such as (1) a poly(oxyethylene) chain, (2) a chain having alternating blocks or backbone segments of oxyethylene units and oxypropylene units, or (3) a chain of randomly distributed (i.e., a heteric mixture) of oxyethylene and oxypropylene units. The subscript o is the number of oxyalkylene units in said poly(oxyalkylene) chain. The number of oxyethylene units in the prepolymer is sufficient to render it hydrophilic and water-soluble; generally, the oxyethylene content of the prepolymer for this purpose will be at least 30 weight percent, preferably greater than about 50 or even about 70 to 80 weight percent, of the prepolymer. $Y_2$ is an organic linkage or bridge, the function of which is to bond said poly(oxyalkylene) chain to the isocyanate moieties shown in the formula. The subscript p is a number from 1 to 5. Where the prepolymer is an aliphatic poly(isocyanate), $Y_2$ will have aliphatic portion(s), e.g., alkylene, to which the depicted isocyanate moieties are bonded, p is preferably 1, and each of those isocyanate moieties will be bonded to the same or different aliphatic carbon atoms of $Y_2$. Where the prepolymer is prepared by reacting a poly(oxyalkylene) polyol and an polyisocyanate, the poly(oxyalkylene) chain of the prepolymer will be principally terminated on one end with the group —OC(O)NH—$R^4$ (NCO)$_p$, $R^4$ being the organic residue of the polyisocyanate. If the prepolymer is an aliphatic poly(isocyanate), the —NCO moiety of said terminal group is attached to an alkylene moiety of said $R^4$ residue. The moiety —C(O)NH— together with the adjacent oxygen atom of the poly(oxyalkylene) chain is a carbamate (or urethane) group, —OC(O)NH—, resulting from the reaction of a hydroxy group of the poly(oxyalkylene) polyol reactant with an isocyanate moiety from the polyisocyanate reactant. The subscript z is a number equal to the functionality or number of said active-hydrogen atoms in said initiator compound (e.g. said polyhydroxyalkane) and generally z will be 2 to 6, preferably 2 to 4.

Preferred water-soluble prepolymers within the scope of this invention are those of the formula:

$$Y_1[(CH_2CH_2O)_o\text{—}\overset{\overset{\displaystyle O}{\|}}{C}NH\text{—}R^5(NCO)_p]_z \qquad \text{B}$$

where $Y_1$, p and z are as defined above for Formula A, p preferably being 1 to 3, z preferably being 2 to 4, $R^5$ is the organic residue of a polyisocyanate, such as an aliphatic polyisocyanate having one or more aliphatic carbon atoms to which the depicted isocyanate groups are bonded, and o is the number of oxyethylene units necessary to make the prepolymer soluble in water.

Another preferred subclass of water-soluble prepolymers useful in this invention can be expressed by the formula:

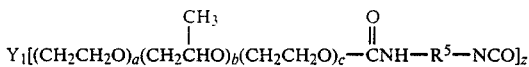
C where $Y_1$, $R^5$, and z are as defined in Formula B, and a, b and c are integers such that the ratio of $(a+c)/b$ is greater than 1, e.g. up to 3 or greater, and thus the prepolymers are water-soluble.

Another preferred subclass of water-soluble prepolymers useful in this invention can be expressed by the formula:

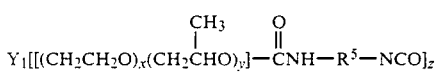
D where $Y_1$, $R^5$, and z are as defined in Formula B, x and y are integers such that the ratio x/y is greater than 1, e.g. up to 3 or greater, and thus the prepolymers are water-soluble, the $CH_2CH_2O$ and $CH_2CH(CH_3)O$ units being randomly distributed within the brackets enclosing the same.

Particularly useful species of the prepolymers of this invention are those represented by the formulas:

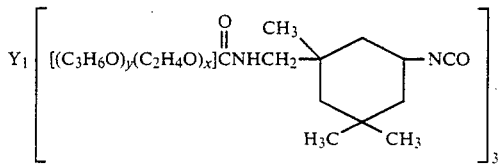

where $Y_1$ is an active hydrogen-free residue of a low molecular weight trihydroxyalkane, such as trimethylolpropane or glycerol, and the ratio x/y is as defined in Formula D, preferably 3/1 to 6/1, and

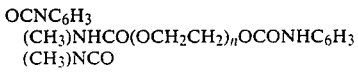
F where n is sufficiently high to render the prepolymer hydrophilic and water-soluble.

Formulas of the reaction product of the prepolymer and isocyanate-reactive dye will be similar to formulas A–F except that one or more of the isocyanate moieties (i.e., —NCO) in the prepolymer will be replaced with the residues of the —NCO moiety and an isocyanate-reactive dye, e.g., —NHC(O)XQ where X is selected from O, NR (where R is as defined above), and S; Q is the dye residue. For example, the reaction product derived from the prepolymer depicted in Formula C and isocyanate-reactive dye is represented by the formula:

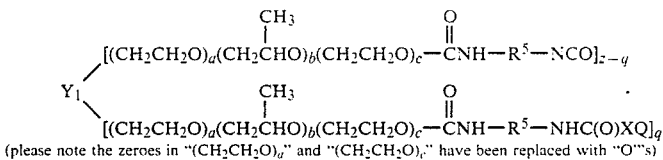
(please note the zeroes in "$(CH_2CH_2O)_a$" and "$(CH_2CH_2O)_c$" have been replaced with "O"s)

wherein $Y_1$, a, b, c, $R^5$ and Z are as defined for Formula C, q is the number of isocyanate moieties in the prepolymer that reacted with isocyanate-reactive dye, and q is equal to at least one, and Q and X are defined above.

The reaction product derived from the prepolymer depicted in formula D and isocyanate-reactive dye can be represented by the formula:

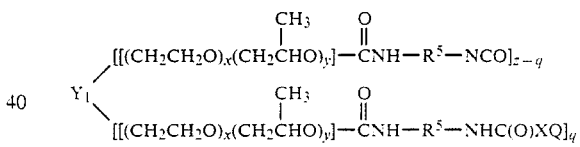

wherein $Y_1$, x, y, $R^5$ and z are as defined in Formula D and q, Q and X are as defined above.

The reaction product derived from the prepolymer depicted in Formula E and isocyanate-reactive dye can be represented by the formula:

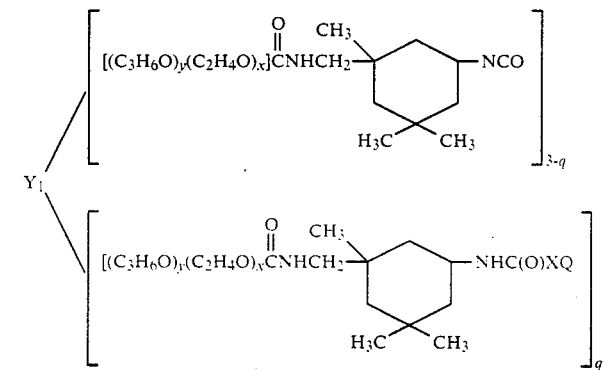
(please note the zero in "NHC(0)XQ" was replaced with an "O".

wherein $Y_1$, x and y are as defined for Formula E, X and Q are as defined above, and q is 1 to 3.

The isocyanate-reactive dyes useful in this invention are inherently light-absorbing, colored, or fluorescent compounds or compositions. The dyes are water-soluble, or -dispersible (i.e., more than sparingly soluble or dispersible in water at ambient temperature). If the dyes are not water-soluble or dispersible, e.g. Sudan IV, they are not readily extractable or leachable from dyed or colored, aqueous air foams even if said foams are prepared by physically mixing or dispersing the dye into an already prepared foam. The dyes comprise molecular species having at least one chromophoric moiety, at least one, preferably more than one, and most preferably 2 to 4 isocyanate-reactive moieties. Dyes most useful in this invention are those which are soluble in the non-reactive organic solvent and/or the prepolymer because otherwise it is difficult homogeneously mix or disperse said dye, and to get the dye to react with the prepolymer. As stated above, isocyanate-reactive moieties are preferably selected from the group consisting of (a) —NHR, (2) —SH, and (3) —C($R^1$)($R^2$)—OH moieties where R, $R^1$ and $R^2$ are selected from the group consisting of hydrogen, alkyl, aryl, or aralkyl group. Hydroxyl moieties directly bonded to a carbon atom, e.g., phenolic hydroxyl moieties which are part of an aromatic ring, are less preferred. Groups with amide moieties such as —$SO_2NH$— and —CONH—, and vinylogous amide moieties, i.e., those moieties conjugated through a vinyl double bond or $\pi$(pi) aromatic conjugation to a carbonyl group, e.g., —C(O)—CH= CH—NHR, do not react or are not sufficiently reactive with isocyanate moieties under urethane bond forming conditions to be considered isocyanate-reactive moieties for the purpose of this invention. Preferred moieties are —NHR and —C($R^1$)($R^2$)—OH moieties, and preferably said aliphatic hydroxyl moieties are primary aliphatic hydroxyl groups, e.g., —$CH_2OH$. Where there is more than one isocyanate-reactive moiety in any particular molecular dye species they may be the same or different. Blends of dyes having different chromophoric moieties can also be used in this invention. For example, the use of a blend of Sodyecron Orange S-SLS and Disperse Blue BNA results in a foam having a clay-brown color which is very useful as a sanitary landfill cover.

Representative classes of dyes useful in this invention include azo, anthraquinone, nitro, methine, quinoline, triarylmethane, and phthalocyanine dyes. Such dyes are known and are described, for example in Bannister, D. W., Olin, A. D., and Stingl, H. A., "Dyes and Dye Intermediates", *Kirk-Othmer Encyclopedia of Chemical Technology*, 3rd Ed., 8, John Wiley & Sons (1979), pp. 162–168. Representative examples of dyes useful in this invention are summarized in Table I:

TABLE I

| Dye | Structure |
|---|---|
| 1 |  |
| 2 & 3 |  |
| 4 |  |
| 5 |  |
| 6 |  |

Dye "1" is Basic Brown 4, C.I. No. 58205, commercially available as "Bismarck Brown TSS" from GAF Corporation. Dye "2" is "Reactint Orange X38" and dye "3" is "Reactint Blue X3LV", both are commercially available from Milliken and Company, (the R groups in dyes 2 and 3 are proprietary to Milliken and Company, however, the dyes are further described in U.S. Pat. No. 4,775,748 (Kluger et al.)). Dye "4" is Disperse Brown 1, and is commercially available as "Sodyecron Orange S-SLS" from Sandoz Chemical Corporation. Dye "5" is Disperse Blue 3, C.I. No. 61505, and is commercially available as "Disperse Blue BNA" from Atlantic Industries. Dye "6" is Mordant Brown 13, C.I. No. 13225, and is commercially available as "Calcochrome Brown 2R" from American Cyanamid Corporation.

Suitable water-soluble, polyamine reactants which may be included in the dyed or colored, foamable aqueous solution include water-soluble or water dispersible polyamines such as ethylenediamine, 1,2-propylenediamine, hexamethylenediamine, piperazine, hydrazine, bis-(2-aminoethyl) ether, and $H_2NCH(CH_3)CH_2[OCH_2CH(CH_3)]_{2.6}NH_2$ (JEFFAMINE D-230).

If the isocyanate functionality of the dyed or colored, gelling or viscosity-increasing agent is about 2, the resulting dyed or colored polyurea formed therefrom will be mainly linear and non-crosslinked, unless crosslinkers are included in the dyed or colored foamable solution, such as diethylene triamine, triethylenetetraamine, etc. If the isocyanate functionality is greater than 2, e.g., 3, a dyed or colored, crosslinked polyurea will result. Also, the isocyanate-reactive dye can also act as a crosslinker.

Water-soluble or water-dispersible, aprotic, anhydrous, non-reactive (free of active hydrogen atoms) organic solvents preferably should be chosen such that the resulting solution will be liquid at the ambient conditions of storage or use. Useful solvents include acetone, ethyl acetate, methyl ethyl ketone, dibutyl phthalate, benzyl butyl phthalate, tetrahydrofuran, dimethylformamide, diethylene glycol monoethyl ether acetate (sold under the trade designation DE acetate), propylene glycol monomethyl ether acetate (sold under the trade designation PM acetate), gamma-butyrolactone, N-methyl-2-pyrrolidone, and diethyl acetal. If the amount of solvent used to facilitate handling would disadvantageously affect the foamability of the dyed or colored, aqueous foamable solution, a readily foamable, readily pumpable fluid can be made with a lesser amount of such solvent by additionally incorporating in the gelling or viscosity-increasing agent solution a lower molecular weight, isocyanate-terminated prepolymer, which may even be water-insoluble per se (but soluble in the gelling or viscosity-increasing agent solution).

The surfactants, surface-active agents, or surfactant foaming agents useful in this invention are the same as those described in U.S. Pat. Nos. 4,795,590 and 4,795,764, which descriptions are herein incorporated by reference. Briefly, the surfactants useful in the practice of this invention are synthetic or natural organic compounds or materials capable of foaming water, which are compatible with the gelling or viscosity-increasing agent. Those surfactants which are preferred are those sometimes characterized as capable of forming "strongly foaming solutions", e.g., see "Foams", J. J. Bikerman, published by Springer-Verlag, New York, Inc., pages 108–132 (1973).

The surfactants useful in this invention can be nonionic, cationic, anionic, or amphoteric, and compatible mixtures thereof and can include fluoroaliphatic surfactants and blends of fluoroaliphatic surfactants and fluorine-free surfactants. However, for sanitary landfill applications, fluorine-free surfactants are preferred.

The usefulness of a surfactant, and its amount, for purposes of this invention, can be determined by the foam volume or height and its resistance to collapse. Generally, the applicable surfactant and amount thereof useful in producing the dyed or colored foams of this invention will yield a foam volume (or height) at least twice that of the dyed or colored, foamable aqueous solution, a simple test for this purpose being the shaking by hand of the solution in a suitable closed container. For example, 100 g of such solution is vigorously shaken 25 times in a 450 mL or larger, closed glass jar or a calibrated vessel, and the height of the resulting foam vis-a-vis the height of the solution before shaking is measured, the ratio of foam height to prefoamed solution height being the expansion value.

Optional components of the dyed or colored foam systems of this invention include: polymeric stabilizers and thickeners such as polysaccharides, partially hydrolyzed protein, starches, polyvinyl resins, e.g. polyvinyl alcohol and polyacrylamides, carboxyvinyl polymers, and poly(oxyethylene) glycol; foam stabilizers such as ethylene glycol, diethylene glycol, glycerol, ethylene glycol monoethyl ether, and diethylene glycol monobutyl ether; foam tougheners and shrink control agents, such as aqueous rubber or polymeric latices, e.g. styrene-butadiene rubber latices, poly(chloroprene) rubber latices, poly(chloroprene-co-methacrylic acid) rubber latices, and the polymer latices described in said U.S. Pat. No. 4,315,703; and other additives or components such as electrolytes, corrosion inhibitors, and biocides. Such optional components should be compatible with the other components in the dyed or colored foam systems and are used in amounts which do not disadvantageously affect the desired properties, such as foamability, function, e.g. sealing capability, and color of the foam system.

The total amount of solids attributable to said optional components will be such that the dyed or colored aqueous solution is still foamable and the density of the dyed or colored foam prepared therefrom is less than 1 g/cc. Generally, the amount of solids attributable to said optional components will be less than about 40 weight percent, preferably less than about 30 weight percent, of the dyed or colored, foamable aqueous solution.

The dyed or colored, aqueous fluid foams of this invention can be generated by the following procedure. Solutions of the gelling or viscosity-increasing agent in water-soluble organic solvents, e.g., acetone or methyl ethyl ketone, or in water-soluble or -dispersible organic solvents, e.g., dibutyl phthalate, or as solutions in a blend of solvents, are mixed with an aqueous solution containing surfactant and polyamine in the desired ratio, e.g., with a proportioning apparatus. The resulting dyed or colored, aqueous, foamable solution is sprayed under pressure through a foam-generating nozzle, such as an air-injecting or air-aspirating nozzle, to generate the dyed or colored, fluid aqueous foam. Gelation time of the dyed or colored, aqueous foam, or the time at which it reaches its desired increase in viscosity, can be controlled by the proper selection and concentration of the gelling or viscosity-increasing agent, aqueous foaming agent, water-soluble polyamine, chain extending agents, cross-linking agents, urea-forming catalyst and aqueous foaming agent, and chain terminating agents such as monofunctional amines.

A particularly useful proportioning, foam-generating and foam application apparatus for making the dyed or colored foams comprises a pressure vessel containing separate tanks for the gelling or viscosity-increasing agent, for a solvent for flushing out lines after use, and optionally, for water used to dilute the gelling or viscosity-increasing agent, a pressure vessel for the aqueous solution of surfactant and optionally, polyamine reactant, a gear pump driven by a variable speed motor to supply via a check valve the gelling or viscosity-increasing agent and flush solvent from their tanks to a helical static mixer, a photo-electric tachometer to sense the speed of the gear pump and regulate the flow of such materials, lines fitted with air pressure regulators and valves for supplying compressed air to the pressure vessels to force the contents therefrom via dip tubes and lines to the check valve, flexible hose connecting the check valve, static mixer, and an air-aspirating nozzle (such as that described in said 3M bulletin Y-FATCB(311)BE) for application of the dyed or colored foam, and other associated pipe lines or hoses, etc., connecting the pieces of equipment as described.

Descriptions of various equipment systems that can be used for handling and applying the dyed or colored foam system of this invention are described in above-cited 3M bulletins and in the NFPA-11-1983 Standard of the National Fire Protection Association, Inc. for "Low Expansion Foam and Combined Agent Systems".

The hazardous materials which can be treated or controlled with the foam in accordance with this invention include the various materials present in sanitary landfills and hazardous waste sites described at the beginning of this specification, such as land burial dumps, impoundments, and lagoons. Such materials can be organic or inorganic liquids, semi-liquids, or solids, such as synthetic or natural organic chemicals, heavy or toxic metals, solvents, effluents, household garbage and trash, discarded products, spent raw materials, contaminated containers, sludges, mill tailings, burn residues, contaminated soil, flammable and volatile liquids, etc., disposed in such sites from industrial and commercial operations, etc. Such wastes can be toxic, noxious, ignitable, flammable, combustible, corrosive, or dangerously reactive. The body of such materials can be treated in situ with the dyed or colored foam or as excavated or removed from such sites. Spills or leaks of hazardous liquids from pipelines or containers such as tanks or vehicles can also be treated.

When the body of such materials are treated in situ with the dyed or colored foam of this invention; the foam can seal or contain such substrate body while coloring it. Thus, for example, a green foam can be useful to treat an unplanted or newly seeded landscape to prevent soil erosion while improving aesthetics of said landscape.

Materials which are not wastes, spills, or the like but rather have utility and are innately harmful or have toxicity, and thus are potentially hazardous, can also be treated with the dyed or colored foam, for example coal in transport by train cars or barges or the coal in mine tunnels, to seal the exposed surfaces from air and minimize or prevent fires or to control such fires. Thus, the term "hazardous" in its broader sense is used in this application to include present or imminent hazards due to existing exposure as well as potential hazards due to the innate harmful or toxic effects of a material which becomes hazardous upon exposure.

The dyed or colored foams can also be used in suppression of noise or shock waves emanating, for example, from machinery. Plastic bags, e.g., polyethylene bags, filled with the dyed or colored foam can also be used for shock absorption, e.g., as rescue pads in the escape from burning buildings.

Other applications for the dyed or colored foam of this invention include use as a thermal insulating blanket or barrier, e.g., for Class A combustible material such as residential or commercial building structures, e.g., walls and roofs, and use as a fire break in brush or forest fires.

Another use as an insulating blanket for the foam of this invention is as an aid in controlling the curing or setting of cementitious materials, such as concrete, mortar, or cement slurries, especially in cold, subfreezing weather, where the dyed or colored foam acts as a thermal blanket for accelerating the curing of the slurry by retaining the heat of the curing reaction, or where it is desired to retain moisture during curing or preventing rain water from affecting curing.

Generally, the materials or substrates that can be treated with the dyed or colored foams of this invention will be those that are not reactive, undesirably reactive, or adversely affected by the dyed or colored aqueous air foams.

The amount or thickness of dyed or colored foam applied to the hazardous material or substrate or the extent of its application can vary depending on such factors as the nature, magnitude, location, and permanency of the hazardous material or substrates, the presence of environmental factors such as wind, rain, drainage, etc., and the particular threat to health, safety, and environment that the material poses. The thickness of the dyed or colored foam applied to the material thus can vary, for example from 1 cm to 30 cm or higher, e.g., up to 1 meter or more. In any event, the thickness of the dyed or colored foam will generally be sufficient to alleviate or prevent the threat posed by the material or to achieve the desired function of the foam, e.g. as an insulating blanket, shock wave absorber, and noise suppresser. Where the material evolves or releases volatile or superficial products such as gases, fumes, vapors, dust, etc., or it is desired to seal a material from ambient air to control or prevent combustion or oxidation of the material, the amount or thickness of the dyed or colored foam will be such as to suppress the volatilization or escape of the material to the atmosphere or suppress its contact with atmosphere, the relative vapor impermeability of the dyed or colored foam due to its large amount of water and closed cell structure significantly contributing to such suppression.

In the case of flammable liquids such as hydrocarbons and polar solvents and combustible liquids, such as gasoline, diesel fuel and other fuels, or chemicals which are volatile or noxious, such as naphthalene, the dyed or colored foams of this invention can be applied in the same manner as the conventional aqueous film-forming solutions applied as a water-base foam for fire suppression or vapor control—see the aforementioned commercial bulletins and NFPA Standard 11-1983. Like such conventional products, where the surfactant used in generating the dyed or colored foams of this invention is the aforementioned combination of fluoroaliphatic and hydrocarbon surfactants, such dyed or colored foams can be used to control or combat fires of flammable materials, such as aircraft fuel fires, petrochemical storage facility fires, oil tanker fires, and coal car fires, and various industrial fires of spilled fuel and solvent. Like conventional AFFF products, the applied dyed or colored foam of this invention will spread over and float on the surface of the flammable or burning liquid. A durable, rapidly forming, and spreading vapor-sealing film of aqueous surfactant drains from the dyed or colored foam before it gels or becomes viscous, aiding it in suppressing the volatilization of the liquid and extinguishing such fires, such film and foam also securing non-ignited areas and preventing ignition or re-ignition. Because of the stability and long life of the dyed or colored, gelled or viscous foam of this invention, the re-application of it will generally not be necessary or often required (particularly if the dyed or colored foam is gelled), unlike conventional AFFF products which produce foams having a much shorter life, due to drainage and collapse, and have greater mobility or susceptibility to dislodgment due to wind, evaporation, and the thermal convection caused by fires.

Objects and advantages of this invention are illustrated in the following examples. The water referred to in these examples was deionized water. Where comparison examples were carried out, they are sometimes designated by the letter "C" and followed by a number, e.g., C1, C2 etc.

The dyes depicted in Table II were used in the following Examples.

TABLE II

| Dye name (manufacturer) | Dye structure |
|---|---|
| Sodyecron Orange S-SLS (Sandoz Chemicals, Inc.) | $O_2N$-⟨ring⟩(Cl)-N=N-⟨ring⟩-N($C_2H_4OH$)($C_2H_4OH$) |
| Disperse Blue BNA (Atlantic Industries, Inc.) | anthraquinone with HN-$CH_3$ and HN-$C_2H_4OH$ |
| Reactint Orange X38 or Reactint Blue X3LV (Milliken Corp.) | thiophene($R^6,R^7,R^8$)-N=N-⟨ring⟩($R^9,R^{10},R^{11},R^{12}$)-N(($C_nH_{2n}O)_xH$)(($C_nH_{2n}O)_yH$) |
| Purpurin (Eastman Kodak, Inc.) | anthraquinone with OH, OH, OH substituents |
| Bismarck Brown TSS (GAF Corp.) | $H_2N$-⟨ring⟩($NH_2$,$CH_3$)-N=N-⟨ring⟩($CH_3$)-N=N-⟨ring⟩($NH_2$,$CH_3$)-$NH_2$ |
| Sudan Orange RA (GDC Corp.) | ⟨phenyl⟩-N=N-⟨naphthyl-OH⟩ |

TABLE II-continued

| Dye name (manufacturer) | Dye structure |
| --- | --- |
| Solochrome Violet RS (K & K Laboratories, Inc.) | |
| Diazo Brilliant Orange GR (Atlantic Industries) | |
| Calcochrome Brown 2R (American Cyanamid Corp.) | |
| Fastusol Blue LF3GL (GAF Corp.) | |
| Methyl Yellow (Hartman Leddon Co.) | |

EXAMPLES 1-12

These examples describe the preparation of dyed or colored, poly(oxyalkylene) poly(aromatic-isocyanate) gelling or viscosity-increasing agents. It also describes the preparation of dyed or colored, aqueous air foams using the dyed or colored, gelling or viscosity-increasing agents.

The prepolymer used in these examples was prepared according to a procedure similar to that used to prepare "Prepolymer B" in U.S. Pat. No. 4,795,590 except that the prepolymer was prepared as a 70 weight % solution in acetone (rather than a 80 weight % solution in acetone). Hereinafter this prepolymer solution will be referred to as "Prepolymer I".

Various commercially available organic dyes were reacted with Prepolymer I, and gelled air foams were prepared from the resulting dyed or colored, aqueous foamable solutions. Comparative extraction tests were run on the resulting dyed or colored foams to determine what percentage of the dye was leached from the gelled foams.

Dye slurries or solutions were first made by mixing 1.00 g of each dye with 19.00 g of DE acetate. 1.00 g of each dye slurry or solution in DE acetate was then added to 20.0 g of Prepolymer I in a 30 mL glass bottle. bottles were shaken to disperse each dye, and the bottles were placed in an oven at 56° C. for 24 hours with occasional manual shaking to allow each dye to maximally react with Prepolymer I.

Dyed or colored, gelled foams were then prepared from the dyed or colored gelling agents. A "Foamer A" solution was prepared by mixing a foam concentrate solution (0.75 g) containing 20.8 weight % sodium n-decyl sulfate, 5.2 weight % cocodimethylamine oxide, 26.0 weight % diethylene glycol monobutyl ether and 48.0 weight % water with 45.0 g water in a 450 mL glass jar. Using a 10 mL disposable syringe, 4.2 g of Prepolymer I was quickly injected, the jar immediately was capped and shaken vigorously for about 15 seconds to make a dyed or colored aqueous air foam. Each dyed or colored air foam was allowed to stand for approximately one hour to achieve full cure.

In the Comparative Extraction Test, foam samples were then contacted with water to determine the amount of dye that could be leached or extracted from the dyed or colored foam. To each dyed or colored foam sample was added 250 g of water. Each jar was then capped and shaken for approximately 16 hours at low speed on an Eberbach tabletop oscillating shaker. After shaking a portion of each solution was filtered through a 0.45μ disposible syringe filter assembly to remove particulates.

As controls, foams were prepared using the same procedure except that the dye was not reacted with the prepolymer and instead was added to the 250 g deionized water. In this way, the dye would be expected to distribute itself fairly uniformly between the foam and water, never having had a chance to chemically react with the isocyanate-endcapped prepolymer. Thus, in both dyed or colored air foams and controls, the total amount of dye used was the same (0.010 g).

The filtered solutions were analyzed for dye content using an IBM Model 9420 Ultraviolet-Visible Spectrophotometer. The absorbance values for each solution were measured at the wavelength of maximum absorbance for each dye. The ratio in absorbance between each sample and its control roughly approximates the fraction of dye extracted from a dyed or colored foam. The dyes used, amounts of reactants, the absorbances, and the ratio of the absorbance of the sample and its control are summarized in Table III:

TABLE III

| Example | Dye | Wave length (nm) | Absorbance leachate | Absorbance control | Ratio |
|---|---|---|---|---|---|
| 1 | Sodyecron Orange S-SLS | 457 | 0.008 | 0.040 | 0.20 |
| 2 | Disperse Blue BNA | 586 | 0.013 | 0.049 | 0.27 |
| 3 | Reactint Orange X38 | 493 | 0.028 | 0.115 | 0.24 |
| 4 | Reactint Blue X3LV | 628 | 0.041 | 0.624 | 0.07 |
| 5 | Purpurin | 508 | 0.233 | 0.153 | 1.52 |
| 6 | Bismarck Brown TSS | 475 | 0.022 | 0.150 | 0.15 |
| 7 | Sudan Orange RA | 479 | 0.049 | 0.027 | 1.81 |
| 8 | Solochrome Violet RS | 524 | 0.159 | 0.161 | 0.99 |
| 9 | Diazo Brilliant Orange GR | 468 | 0.082 | 0.107 | 0.77 |
| 10 | Calcochrome Brown 2R | 454 | 0.035 | 0.508 | 0.07 |
| 11 | Fastusol Blue LF3GL | 674 | 0.066 | 0.087 | 0.76 |
| 12 | Methyl Yellow | 450 | 0.085 | 0.020 | 4.25 |

The data showed that dyes that did not contain one or more isocyanate-reactive moieties or at least one aliphatic hydroxy group have absorbance ratios greater than 0.3 and were unacceptable. Diazo Brilliant Orange GR dye has only one isocyanate-reactive moiety, i.e. —$NH_2$, but it may have performed poorly because the dye-DE acetate mixture was fairly insoluble in Prepolymer I, hence it was difficult for the dye and prepolymer to react.

EXAMPLES 13–24

These examples describe the preparation of dyed or colored, poly(oxyalkylene) poly(aliphatic isocyanate) gelling or viscosity-increasing agents. They also describe the preparation of dyed or colored, air foams using the dyed or colored, gelling or viscosity-increasing agents.

The prepolymer used in these examples was prepared using a method similar to that described in U.S. Pat. No. 4,795,764, i.e., poly(oxyalkylene) poly(aliphatic isocyanate prepolymer). The 100% solids prepolymer was dissolved in sufficient commercial grade diethylene glycol monoethyl ether acetate (DE acetate) to provide a 50 weight percent solids solution, hereinafter designated "Prepolymer II".

Various commercially available organic dyes were reacted with Prepolymer II, and gelled air foams were prepared from the resulting dyed or colored, aqueous foamable solution. Comparative Extraction Tests were run on the resulting dyed or colored foams to determine what percentage of the dye could be leached or extracted from the gelled foams.

Dye slurries or solutions were first made by mixing 1.00 g of each before mentioned dye with 19.00 g DE acetate. 1.00 g of each dye slurry or solution in DE acetate was added to 20.0 g of Prepolymer II in an approximately 30 mL glass bottle, bottles were shaken to disperse each dye, and the bottles were placed in an oven at 85° C. for 20 hours with occasional manual shaking to allow each dye to maximally react with the prepolymer.

Dyed or colored gelled foams were then prepared from the gelling agents. A "Foamer B" solution was first prepared by mixing a foam concentrate solution (0.62 g) containing 20 weight % sodium n-decyl sulfate, 5 weight % lauryldimethylamine oxide, 25 weight % diethylene glycol monobutyl ether, 4 weight % diethylenetriamine, and 46 weight % water with 24.4 g water in a 50 mL glass beaker. A dyed or colored prepolymer solution was also prepared by mixing 4.2 g dyed or colored Prepolymer II with 20.8 g water in a 450 mL glass jar. The Foamer B solution was then added to the dyed or colored prepolymer solution and the jar was capped and shaken vigorously for about 15 second to make a dyed or colored aqueous air foam. Each dyed or colored foam was allowed to stand for approximately one hour to achieve full cure.

Foam samples were then shaken with 250 g water as before to leach out unreacted dye. After shaking, both control and leachate solutions were filtered as before to remove particulates and were analyzed for dye using the spectrophotometric procedure described in Examples 1–12. The dyes used, amounts of reactants, the absorbances and absorbance ratios are summarized in Table IV.

TABLE IV

| Example | Dye | Wave length (nm) | Absorbance leachate | Absorbance Control | Ratio |
|---|---|---|---|---|---|
| 13 | Sodyecron Orange S-SLS | 469 | 0.005 | 0.074 | 0.07 |
| 14 | Disperse Blue BNA | 633 | 0.015 | 0.119 | 0.13 |
| 15 | Reactint Orange X38 | 490 | 0.014 | 0.210 | 0.07 |
| 16 | Reactint Blue X3LV | 628 | 0.017 | 0.680 | 0.03 |
| 17 | Purpurin | 508 | 0.261 | 0.363 | 0.72 |

TABLE IV-continued

| Example | Dye | Wave length (nm) | Absorbance leachate | Absorbance Control | Ratio |
|---|---|---|---|---|---|
| 18 | Bismarck Brown TSS | 470 | 0.012 | 0.588 | 0.02 |
| 19 | Sudan Orange RA | 482 | 0.037 | 0.094 | 0.39 |
| 20 | Solochrome Violet RS | 503 | 0.132 | 0.279 | 0.47 |
| 21 | Diazo Brilliant* Orange GR | — | — | — | — |
| 22 | Calochrome Brown 2R | 454 | 0.037 | 0.683 | 0.05 |
| 23 | Fastusol Blue LF3GL* | — | — | — | — |
| 24 | Methyl Yellow | 418 | 0.102 | 0.144 | 0.71 |

*dyes were not soluble in Prepolymer I

The data again showed that dyes that did not contain at least two isocyanate-reactive moieties or at least one aliphatic hydroxyl group were unacceptable.

EXAMPLE 25

This example illustrates the preparation of a dyed or colored, aqueous air foam prepared using more than one of the isocyanate reactive dyes.

The air foam was prepared from Prepolymer II according to the procedure described in Examples 1-12, except that instead of reacting only one type of dye with Prepolymer II to make the foam, a blend of prepolymer-dye derivatives was used.

2.8 g of Prepolymer II-Sodyecron Orange S-SLS derivative and 1.4 g of Prepolymer II Disperse Blue BNA derivative were dissolved in water and mixed with Foamer B solution as described in Examples 13-24 to make a dyed or colored, aqueous air foam. The dyed or colored foam was clay brown in color.

A foam sample was then shaken with 250 g of water as described above to leach any unreacted dye out of the dyed or colored foam. The leachate and a control solution were analyzed as described in Examples 1-12 and the light absorbances of the control and leachate solutions were measured at wavelengths of maximum absorption for both dyes using the same spectrophotometer. The absorbance of the leachate sample was 0.003 and 0.005, the absorbance of the control was 0.063 and 0.061, and the ratio of the absorbances was 0.05 and 0.08 respectively, indicating a very acceptable dyed or colored aqueous air foam. The appearance of the dyed or colored foam leachate was water-white, with no hint of color.

COMPARATIVE EXAMPLES C1-C4

These examples illustrate the importance of reaction temperature in getting substantially all of the dye to react with the prepolymer. Dyed or colored aqueous air foams were prepared according to a method similar to that described in Examples 13-24 except that the prepolymer and dye were reacted at 56° C. instead of 85° C. The resulting dyed or colored foams were subjected to the same Comparative Extraction Test and the light absorbances of the leachate solutions were measured using the same spectrophotometeric procedure described above.

The light absorbances of the leachate samples along with their corresponding example from Examples 13-24 are summarized in Table V.

TABLE V

| Example | Comparative Example | Dye | Wave length (nm) | Absorbance leachate 56° C. | Absorbance leachate 85° C. |
|---|---|---|---|---|---|
| 15 | C1 | Reactint Orange X38 | 490 | 0.053 | 0.014 |
| 16 | C2 | Reactint Blue X3LV | 628 | 0.051 | 0.017 |
| 18 | C3 | Bismarck Brown TSS | 470 | 0.050 | 0.012 |
| 22 | C4 | Calochrome Brown 2R | 454 | 0.98 | 0.037 |

The data show that less dye was leached from dyed or colored foams made from gelling or viscosity-increasing agents prepared by reacting the Prepolymer II and dye at a higher temperature. This illustrates the importance of ensuring that reaction conditions are chosen that will allow the dye to substantially completely react with the prepolymer. These conditions will vary depending upon the prepolymer and dye used.

Various modifications and alterations of this invention will become apparent to those skilled in the art without departing from the scope and spirit of this invention.

What is claimed is:

1. A dyed or colored, non-extractable or non-leachable, air-entrained, closed cell, low density, fluid, aqueous air foam comprising: (A) air as a discontinuous gas phase and the major component of said foam by volume; and (B) a continuous, dyed or colored, polymeric, aqueous, liquid phase comprising water as the major component of said foam by weight, surfactant, and dyed or colored, gelling or viscosity-increasing agent consisting essentially of a mixture of poly(oxyalkylene) polyisocyanate prepolymer and reaction product derived from said poly(oxalkylene)polyisocyanate poly(oxyalkylene) prepolymer and one or more isocyanate-reactive dyes.

2. The air foam of claim 1 wherein said dyed or colored, gelling or viscosity-increasing agent consists essentially of:

(A) a first amount of prepolymer represented by the formula

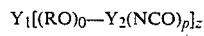

$$Y_1[(RO)_o-Y_2(NCO)_p]_z$$

where $Y_1$ is an active hydrogen atom-free residue of a low molecular weight, initiator organic compound having a plurality of active hydrogen atoms, $(RO)_o$ is a hydrophilic poly(oxyalkylene) chain having a plurality of oxyethylene units, the subscript o is the number of oxyalkylene units in said poly(oxyalkylene) chain said number of oxyethylene units being sufficient to render said prepolymer hydrophilic and water-soluble, $Y_2$ is an organic linkage the function of which is to bond said poly(oxyalkylene) chain to the isocyanate moieties shown in the formula, the subscript p is a number from 1 to 5, and the subscript z is the number equal to the number of active-hydrogen atoms in said initiator compound; and (B) a second amount of reaction product derived from of said prepolymer and one or more isocyanate-reactive dyes.

3. The air foam of claim 2 wherein said dyed or colored, gelling or viscosity-increasing agent consists essentially of 50 weight percent or more of said (A) and 50 weight percent or less of said (B).

4. The air foam of claim 3 wherein said dyed or colored, gelling or viscosity-increasing agent consists essentially of at least 90 weight percent of said (A) and 10 weight percent or less of said (B).

5. The air foam of claim 2 wherein said dyed or colored, gelling or viscosity-increasing agent consists essentially of:
(A) a first amount of prepolymer represented by the formula

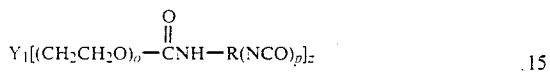

wherein $Y_1$ is an active hydrogen atom-free residue of an organic compound having a plurality of active hydrogen atoms, p is 1 to 3, and z is 2 to 4, R is an organic residue of a polyisocyanate, and o is the number of oxyethylene units necessary to make the prepolymer soluble in water; and
(B) a second amount of reaction product derived from said prepolymer and one or more isocyanate-reactive dyes.

6. The air foam of claim 2 wherein said dyed or colored, gelling or viscosity-increasing agent consists essentially of:
(A) a first amount of prepolymer represented by the formula:

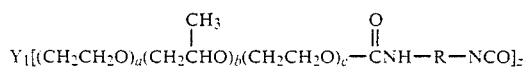

wherein $Y_1$ is an active hydrogen atom-free residue of an organic compound having a plurality of active hydrogen atoms, R is an organic residue of a polyisocyanate, z is 2 to 4, and a, b and c are integers such that the ratio of $(a+c)/b$ is greater than 1 and thus the prepolymers are water-soluble; and
(B) a second amount of reaction product derived from said prepolymer and one or more isocyanate-reactive dyes.

7. The air foam of claim 6 wherein said reaction product is represented by the formula:

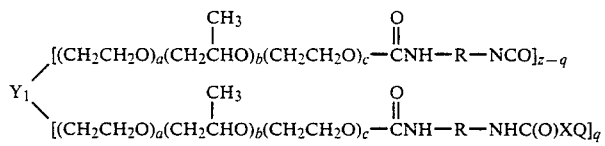

wherein $Y_1$ is an active hydrogen atom-free residue of an organic compound having a plurality of active hydrogen atoms, R is an organic residue of a polyisocyanate, z is 2 to 4, a, b and c are integers such that the ratio of $(a+c)/b$ is greater than 1 and thus the prepolymers are water-soluble, Q is the residue of an isocyanate-reactive dye, q is the number of prepolymer isocyanate moieties that have reacted with isocyanate-reactive dye, and q is equal to at least one, and X is selected from the group consisting of —O—, >$NR^1$, and —S—, where $R^1$ is selected from the group consisting of hydrogen, alkyl, aryl, and aralkyl groups.

8. The air foam of claim 2 wherein said dyed or colored, gelling or viscosity-increasing agent consists essentially of:
(A) a first amount of prepolymer represented by the formula

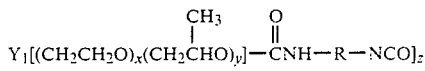

wherein $Y_1$ is an active hydrogen atom-free residue of an organic compound having a plurality of active hydrogen atoms, R is an organic residue of a polyisocyanate, z is 2 to 4, and x and y are integers such that the ratio of x/y is greater than 1 and the prepolymer is thus water-soluble and hydrophilic, the $CH_2CH_2O$ and $CH_2CH(CH_3)O$ units being randomly distributed within the brackets enclosing said units; and
(B) a second amount of reaction product derived from prepolymer and one or more isocyanate-reactive dyes.

9. An air foam according to claim 8 wherein said reaction product can be represented by the formula:

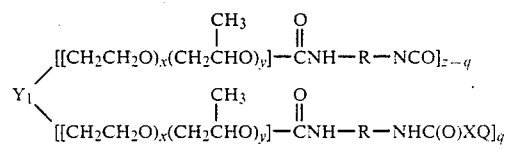

wherein $Y_1$ is an active hydrogen atom-free residue of an organic compound having a plurality of active hydrogen atoms, R is an organic residue of a polyisocyanate, z is 2 to 4, x and y are integers such that the ratio of x/y is greater than 1 and the polymer is thus water-soluble and hydrophilic, the $CH_2CH_2O$ and $CH_2CH(CH_3)O$ units being randomly distributed within the brackets enclosing said units, Q is the residue of an isocyanate-reactive dye, q is the number of prepolymer isocyanate moieties that have reacted with isocyanate-reactive dye, and q is equal to at least one, X is selected from the group consisting of —O—, $\leq NR^1$, and —S—, where $R^1$ is selected from the group consisting of hydrogen, alkyl, aryl, and aralkyl groups.

10. An air foam according to claim 5 wherein said organic residue, R, is selected from the group consisting of an aliphatic residue derived from aliphatic polyisocyanate or an aromatic residue derived from an aromatic polyisocyanate.

11. An air foam according to claim 6 wherein said organic residue, R, is selected from the group consisting of an aliphatic residue derived from aliphatic polyisocyanate or an aromatic residue derived from an aromatic polyisocyanate.

12. An air foam according to claim 7 wherein said organic residue, R, is selected from the group consisting of an aliphatic residue derived from aliphatic polyisocyanate or an aromatic residue derived from an aromatic polyisocyanate.

13. An air foam according to claim 8 wherein said organic residue, R, is selected from the group consisting of an aliphatic residue derived from aliphatic polyisocyanate or an aromatic residue derived from an aromatic polyisocyanate.

14. An air foam according to claim 9 wherein said organic residue, R, is selected from the group consisting of an aliphatic residue derived from aliphatic polyisocyanate or an aromatic residue derived from an aromatic polyisocyanate.

15. The air foam of claim 2 wherein the dyed, gelling or viscosity-increasing agent consists essentially of:
(A) a first amount of prepolymer represented by the formula:

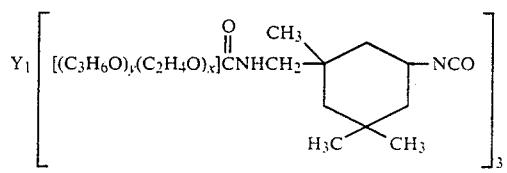

wherein $Y_1$ is an active hydrogen-free residue of a low molecular weight trihydroxyalkane, and the ratio of x/y is greater than 1; and
(B) a second amount of reaction product derived from prepolymer and one or more isocyanate-reactive dyes.

16. The air foam of claim 15 wherein said reaction product can be represented by the formula:

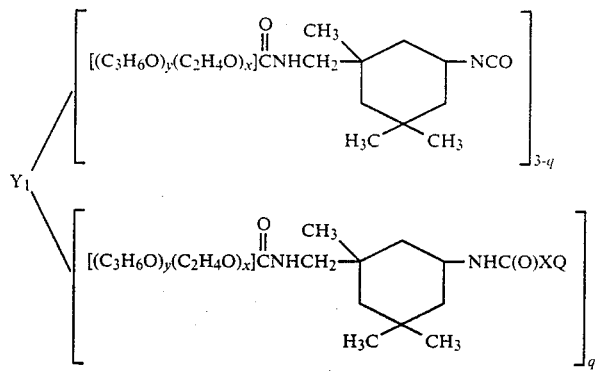

wherein $Y_1$ is an active hydrogen-free residue of a low molecular weight trihydroxyalkane, the ratio of x/y is greater than 1, q is 1 to 3, Q is the residue of an isocyanate-reactive dye, and X is selected from the group consisting of —O—, >$NR^1$, and —S—, where $R^1$ is selected from the group consisting of hydrogen, alkyl, aryl, and aralkyl groups.

17. An air foam according to claim 1 wherein said isocyanate reactive dye has one or more isocyanate-reactive moieties selected from the group consisting of —NHR, —SH, and —C(R')(R")—OH where R, R' and R" are selected from the group consisting of hydrogen, alkyl, aryl, or aralkyl groups.

18. An air foam according to claim 17 wherein said R' and R" are hydrogen.

19. An air foam according to claim 17 having two to four isocyanate-reactive moieties.

20. An air foam according to claim 1 wherein said isocyanate-reactive dyes are selected from the group consisting of Disperse Brown 1, Disperse Blue 3, and blends thereof.

21. An air foam according to claim 1 wherein said surfactant is selected from nonionic, cationic, anionic, and amphoteric surfactants, and compatible mixtures thereof.

22. An air foam according to claim 1 having a density less than 1 g/cc.

23. A dyed or colored, non-extractable or non-leachable, gelled, two-phase, aqueous air foam comprising air as a discontinuous gas phase and the major component of said foam by volume, and a continuous, dyed, aqueous, polymeric hydrogel phase comprising, as the major component of said foam by weight, water in which surfactant is dissolved, and dyed or colored, poly(oxyalkylene) polyurea polymer is dispersed, the oxyalkylene portion of which polymer contains sufficient oxyethylene units to render the polymer hydrophilic.

24. The air foam of claim 23 wherein said dyed or colored, polyurea polymer is the reaction product of:
(A) dyed or colored, gelling or viscosity-increasing agent consisting essentially of a first amount of poly(oxyalkylene) polyisocyanate prepolymer and a second amount of reaction product derived from prepolymer and one or more isocyanate-reactive dyes; and
(B) water.

25. The air foam of claim 23 wherein said dyed or colored, polyurea polymer is the reaction product of:
(A) dyed or colored, gelling or viscosity-increasing agent consisting essentially of a first amount of low moisture sensitive, poly(oxyalkylene) poly(aliphatic isocyanate) prepolymer and a second amount of reaction product of said prepolymer and one or more isocyanate-reactive dyes; and
(B) water-soluble polyamine reactant; said polyurea polymer containing one or more polyurylene-containing segments formed from said polyamine and said agent.

26. The air foam of claim 23 having a density less than 1 g/cc.

27. A dyed or colored, non-extractable or non-leachable, viscous, two-phase, aqueous air foam comprising air as a discontinuous gas phase and the major component of said foam by volume, and a continuous, dyed or colored, viscous, polymeric, liquid phase comprising, as the major component of said foam by weight, water in which surfactant is dissolved, and dyed or colored, poly(oxyalkylene) polyurea polymer, the oxalkylene portion of which polymer contains sufficient oxyethylene units to render the polymer hydrophilic.

28. The air foam of claim 27 wherein said dyed or colored, poly(oxyalkylene) polyurea polymer is the reaction product of:
 (A) dyed or colored, gelling or viscosity-increasing agent consisting essentially of a first amount of poly(oxyalkylene) polyisocyanate prepolymer and a second amount of reaction product derived from said prepolymer and one or more isocyanate-reactive dyes; and
 (B) water.

29. The air foam of claim 27 wherein said dyed or colored, (polyoxyalkylene) polyurea polymer is the reaction product of:
 (A) dyed or colored, gelling or viscosity-increasing agent consisting essentially of a first amount of low moisture sensitive, poly(oxyalkylene) poly(aliphatic isocyanate) prepolymer and a second amount of reaction product derived from prepolymer and one or more isocyanate-reactive dyes; and
 (B) water-soluble polyamine reactant; the polyurea polymer being the product of reaction in water of (A) and (B), said polymer containing one or more polyurylene-containing segments formed from said polyamine and said agent.

30. The air foam of claim 27 having a density less than 1 g/cc.

31. A method of treating a substrate which comprises applying to exposed surface thereof, the fluid air foam of claim 1, and allowing the water and the dyed or colored, gelling or viscosity-increasing agent to react and form a dyed or colored, gelled or viscous air foam on said surface thereby sealing or consolidating, and coloring said substrate making said substrate more visible or decorative, or less visible or camouflaged.

32. A method of treating a substrate which comprises applying to exposed surface thereof, the fluid air foam of claim 1, and allowing water-soluble polyamine reactant and the dyed or colored, gelling or viscosity-increasing agent to react and form a dyed or colored, gelled air foam or viscous air foam on said surface thereby sealing or consolidating, and coloring said substrate making it more visible, decorative, or less visible thereby camouflaging said substrate.

33. The method of claim 31 wherein said substrate is that of a body of hazardous waste.

34. The method of claim 32 wherein said substrate is that of a body of hazardous waste.

35. The method of claim 31 wherein said substrate is that of a body of flammable liquid.

36. The method of claim 32 wherein said substrate is that of a body of flammable liquid.

37. The method of claim 31 wherein said substrate is that of a body of combustible material.

38. The method of claim 32 wherein said substrate is that of a body of combustible material.

39. The method of claim 31 wherein said substrate is a sanitary landfill.

40. The method of claim 32 wherein said substrate is a sanitary landfill.

* * * * *

UNITED STATES PATENT AND TRADEMARK OFFICE
CERTIFICATE OF CORRECTION

PATENT NO. : 4,923,903   Page 1 of 3
DATED     : MAY 8, 1990
INVENTOR(S) : ROGER R. ALM ET AL.

It is certified that error appears in the above-identified patent and that said Letters Patent is hereby corrected as shown below:

Col. 19-20, line 13, In Table II after "Diazo Brilliant Orange GR (Atlantic Industries)" delete "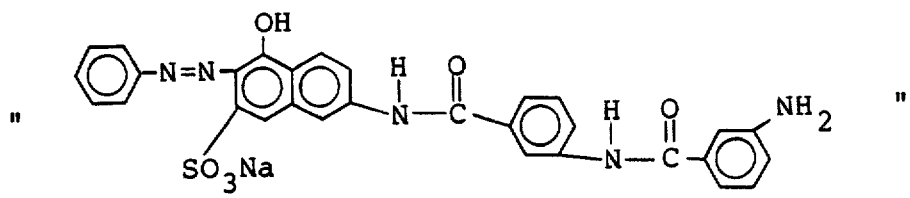"

and substitute therefor

-- 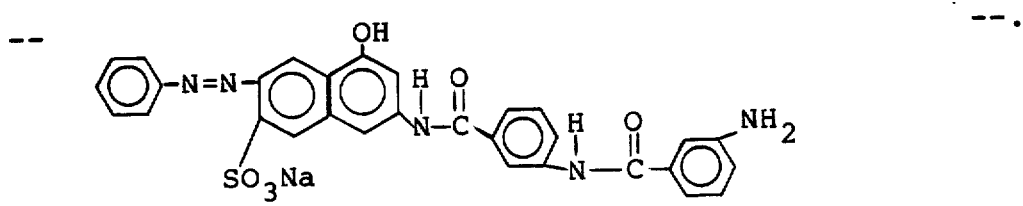 --.

UNITED STATES PATENT AND TRADEMARK OFFICE
CERTIFICATE OF CORRECTION

PATENT NO. : 4,923,903

DATED : MAY 8, 1990

INVENTOR(S) : ROGER R. ALM ET AL.

It is certified that error appears in the above-identified patent and that said Letters Patent is hereby corrected as shown below:

Col. 26, lines 25-30, delete

"  "

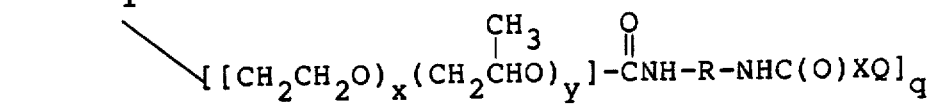

and substitute therefor

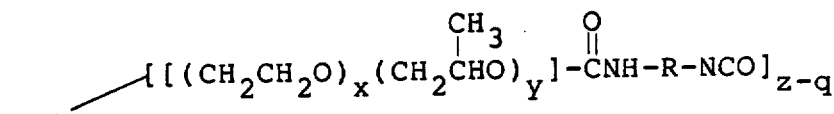

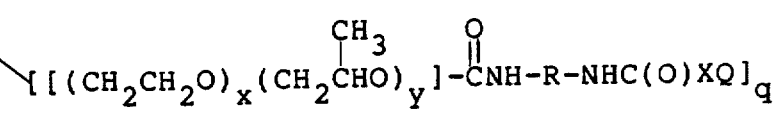 --.

Col. 26, line 43, delete "$\leq NR^1$" and substitute therefor -->$NR^1$--.

UNITED STATES PATENT AND TRADEMARK OFFICE
CERTIFICATE OF CORRECTION

PATENT NO. : 4,923,903
DATED : MAY 8, 1990
INVENTOR(S) : ROGER R. ALM ET AL.

It is certified that error appears in the above-identified patent and that said Letters Patent is hereby corrected as shown below:

Col. 24, lines 38-39, In claim one, delete the second occurrence of "poly(oxyalkylene)".

Col. 24, lines 46-48, "$Y_1[(RO)_o-Y_2(NCO)_p]_z$" should be --$Y_1[(RO)_o-Y_2(NCO)_p]_z$--.

Col. 24, line 65, delete "of".

Col. 26, lines 7-10, delete

"  "

and substitute therefor

-- 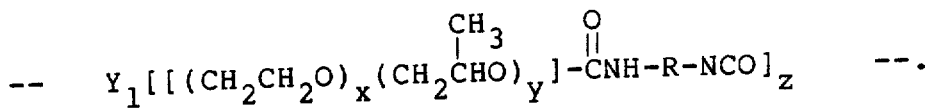 --.

Signed and Sealed this

Eighth Day of January, 1991

Attest:

HARRY F. MANBECK, JR.

*Attesting Officer*  *Commissioner of Patents and Trademarks*